United States Patent [19]

Corby, Jr.

[11] Patent Number: 4,687,326

[45] Date of Patent: * Aug. 18, 1987

[54] INTEGRATED RANGE AND LUMINANCE CAMERA

[75] Inventor: Nelson R. Corby, Jr., Scotia, N.Y.

[73] Assignee: General Electric Company, Schenectady, N.Y.

[*] Notice: The portion of the term of this patent subsequent to Aug. 18, 2004 has been disclaimed.

[21] Appl. No.: 797,361

[22] Filed: Nov. 12, 1985

[51] Int. Cl.⁴ .................. G01C 3/08; G01C 11/08
[52] U.S. Cl. ........................... 356/5; 356/2; 356/152; 358/125
[58] Field of Search .............. 356/1, 2, 5, 141, 152; 358/108, 125

[56] References Cited

U.S. PATENT DOCUMENTS

| | | | |
|---|---|---|---|
| 3,781,111 | 12/1983 | Fletcher et al. | 356/152 X |
| 3,954,335 | 5/1976 | Bodlaj | 356/5 X |
| 4,160,272 | 7/1979 | Thomas et al. | 358/125 X |
| 4,349,277 | 9/1982 | Mundy et al. | 356/376 |
| 4,349,838 | 9/1982 | Daniel | 358/125 |
| 4,443,706 | 4/1984 | DiMatteo et al. | 356/2 X |
| 4,491,719 | 1/1985 | Corby, Jr. | 219/124.34 |
| 4,497,065 | 1/1985 | Tisdale et al. | 356/152 X |

OTHER PUBLICATIONS

D. Nitzan et al, "The Measurement and Use of Registered Reflectance and Range Data in Scene Analysis", Proceedings of the IEEE, vol. 65, No. 2, Feb. 77, pp. 206–220.

M. D. Altschuler et al, "Laser Electro-Optic System for Rapid Three-Dimensional (3-D) Topographic Mapping of Surfaces", Optical Engineering, vol. 20, No. 6, Nov./Dec. 1981, pp. 953–961.

Primary Examiner—Stephen C. Buczinski
Assistant Examiner—Linda J. Wallace
Attorney, Agent, or Firm—Donald R. Campbell; James C. Davis, Jr.; Paul R. Webb, II

[57] ABSTRACT

A three-dimensional range camera, which produces a range map of the distances from a reference to each of $M \times N$ points in a scene, is modified to generate registered luminance and range images. The same sensor detects range and luminance variations. A planar pattern projector generates sequential presentations of time/space coded light rays which are projected onto the object. A linear array camera images the points of light on the object surface, and a processor analyzes one-dimensional scan signals to determine range. To detect luminance there is an additional presentation, either constant illumination or no artificial illumination, and the other scan signal yields luminance along the same strip of the scene.

11 Claims, 9 Drawing Figures

$N = 8$
$P = 1 + \log_2 8 = 4$

RAY No.

| PRESENTATION No. | | 1 | 2 | 3 | 4 | 5 | 6 | 7 | 8 |
|---|---|---|---|---|---|---|---|---|---|
| | 1 | ON | ON | ON | ON | ON | ON | ON | ON |
| | 2 | ON | OFF | ON | OFF | ON | OFF | ON | OFF |
| | 3 | ON | ON | OFF | OFF | ON | ON | OFF | OFF |
| | 4 | ON | ON | ON | ON | OFF | OFF | OFF | OFF |

PATTERN IS 011 = 3;
RAY IS 1 + 3 = 4
ON = 0; OFF = 1

INTEGRATED RANGE AND LUMINANCE CAMERA

BACKGROUND OF THE INVENTION

This invention relates to an optical system which produces a registered pair of images of a scene, such as a robot workspace, one a conventional gray scale, luminance based image and the other a range image.

Two of the major tasks for a machine vision system are object recognition and object pose definition. Pose is defined as the position and orientation of an object in space. Past work in machine vision has stressed computer processing of two-dimensonal luminance images similar to TV images. Some objects are easily recognized in a gray scale image due to fairly reasonable optical contrast between that object and other objects or the background on a scene. Other objects whose contrast is not as pronounced are not as easily discriminated. Recent research activity has focused on generating range images of a scene or group of objects in the field of view. A range image is a two-dimensional array of numbers each of which represents the distance from a given reference point or plane within the range camera to a point physically located on the surface of the object being imaged. There is currently a lot of interest in developing approaches to processing range images in order to recognize an object in the scene, as well as to determine its position and orientation in space.

Each type of image has its own appropriate type of processing. If an object is similar in color and brightness to other objects in its proximity, it may be difficult to isolate it based solely on a two-dimensional luminance view, whereas it may be quite easy to isolate and recognize it based on its size or volume. Similarly, an object may not have a strong three-dimensional nature and so not be easily visible in a range image, but it may strongly differ in color or contrast with its surroundings. Thus, it may be advantageous to be able to simultaneously examine and process the range image and the luminance image to recognize and locate objects. It is probable that by using appropriate processing in each image, the total task can be accomplished faster, cheaper and more easily than if one were to rely solely on either image type.

The problem is how to effectively generate the registered range/luminance images. Optical means using beam splitters and other elements have been used to allow two distinct sensors to be aimed along a common axis. Unfortunately, extensive mechanical setup time and effort are required, and complicated calibration techniques must be used and there is the ever present problem of drift between the two sensors. Maintaining accurate long term alignment is difficult. What is needed is a range imaging technique that allows measurement of reflectance, or surface brightness, using a single common sensing element. Alternatively, one may wish to use a luminance oriented technique that would allow for measurement of range using a single common sensing element.

Since range camera development is a relatively new field there have not been many attempts at registered range/luminance cameras. Most approaches to range measurement employ a structured light technique or a time-of-flight point range sensor which is scanned over the scene. In the structured light case a large beam splitter is utilized to combine the range detection system optically with an ordinary TV-type luminance camera. A similar technique is to have the two cameras aimed at a common point which is fairly distant; the angle between the two views is small and the images nearly coaxial. The second class of device, point rangers using time-of-flight, has been combined in an intrinsic way with reflectance measurement as shown in the published paper by D. Nitzan et al, Proceedings of the IEEE, February 1977. The strength of the return is proportional to the surface reflectance. The reflectance map can indirectly yield the equivalent of a luminance image under given assumptions about lighting, etc.

The three-dimensional range camera in this application is described in the inventor's copending application with that title, Ser. No. 717,367 filed Mar. 28, 1985, the disclosure of which is incorporated herein by reference.

SUMMARY OF THE INVENTION

An object of the invention is to provide a noncontact sensor/camera system in which the same sensor acquires both range and luminance data and which generates registered range and luminance images.

Another object is to modify the above three-dimensional range camera to generate luminance information and range and luminance images that are registered in image space.

The previously disclosed range camera is comprised of a planar pattern projector and linear array sensor combination which allows for range meaurement along N points arranged in a line on the object, corresponding to the intersection of N rays with the surface to be profiled. The projector generates a $1 \times N$ array of time/space coded light rays and projects P sequential presentations of different subsets of the light rays onto the surface of the object, where $P = 1 + \log_b N$, b is the number of brightness levels and N is the number of rays. The linear array sensor generates P one-dimensional scan signals having peaks at locations corresponding to the intersections of light rays with the object surface. A processor analyzes these linear scan signals to uniquely identify all rays and determine range to the object surface at N points along a line. To create area range maps, a means such as a rotating mirror is provided to orthogonally sweep the coded light rays over a rectangular plane.

A registered range/luminance camera results by modifying the pattern projector; in addition to the modulated light patterns just described there is an unmodulated pattern incident on the object at the same place. Typically a uniform stripe of light is projected onto the object or there is no illumination and the object is viewed by ambient light. The one-dimensional scan signal from the linear array camera is the luminance or brightness image and will be exactly in registation with the range image sampled across that strip of the object. Thus at each point in the scene, one knows not only the distance to a given point but also the brightness of that point.

One embodiment of the integrated camera has a pattern projector including a sheet light source and a rotating code disk which has patterned sectors to spatially modulate the light sheet into coded rays. In a binary system (b=2) the patterned sectors have clear and opaque regions and the rays are "on" or "off". After each group of P patterned sectors, there is a completely clear or completely opaque sector; this is utilized to generate luminance data. Remotely generated modulated and unmodulated light patterns may be delivered to the sensing site by projecting them onto the entrance of a coherent fiber optic bundle and reimaging on the object surface.

Another embodiment has a pattern projector including a laser beam source, a modulator to programmably vary its intensity, a beam deflector to sweep the modulated beam along a straight line and a mirror system to scan an area. The beam is completely blanked or unblanked during the traverse period that follows the group of P modulated sweeps. The total number of sweeps to derive a range/luminance profile is P+1 sweeps.

DETAILED DESCRIPTION OF THE INVENTION

Figure 1:
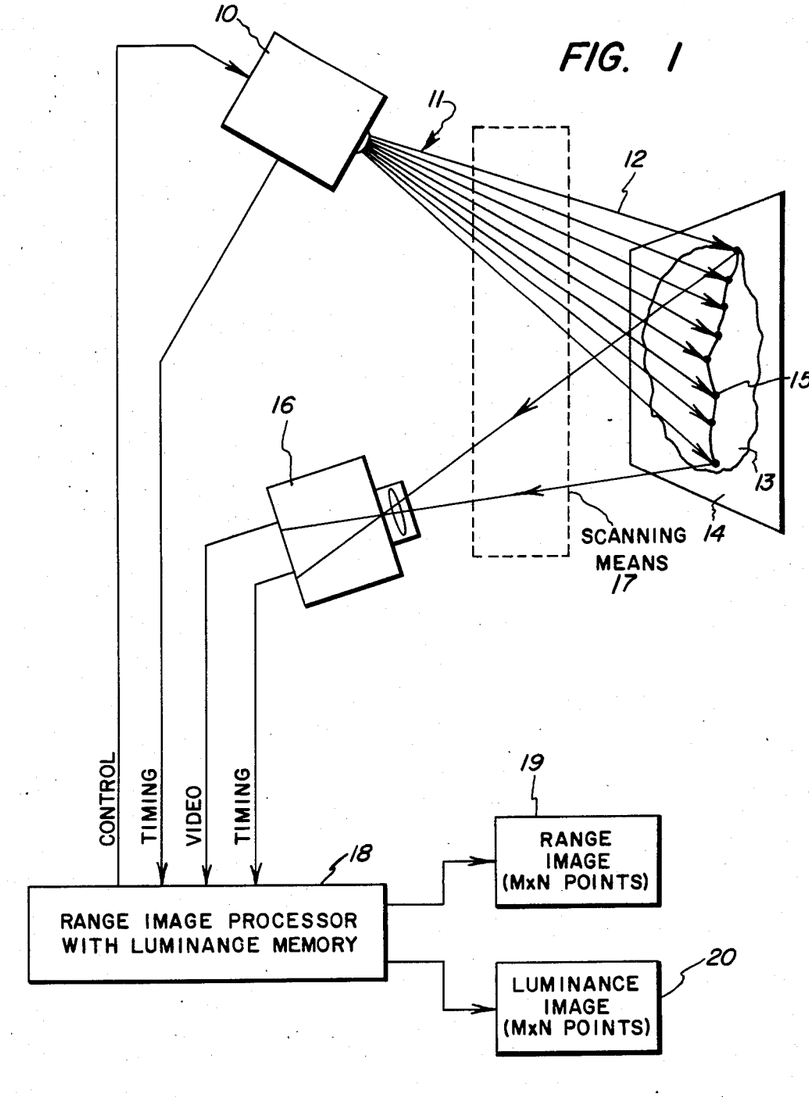
FIG. 1 is a schematic top view of a preferred embodiment of the integrated range/luminance camera system.

Referring to FIG. 1, a ray modulation pattern projector 10 generates at high speed and low cost a 1×N array 11 of time and space coded light rays 12 and projects them unto the surface of a three-dimensional object 13. The support surface 14 on which the object rests is the reference plane; range or depth is measured from the surface of the object to this reference plane. The total number of light rays N is typically large, N=128, 256 or 512, but for illustration in the figures, N=4, 8 and 16. The dots of light 15 where the projected rays 12 intersect the surface of object 13 are detected by a linear array sensor such as line scan, linear array camera 16 which is oriented in the plane of the rays and views the points of light at an angle to the projected rays. The line scan camera may be a Reticon Corp. 1×2048 pixel camera which can scan at rates up to 4,000 scans per second. To acquire data for a luminance image, pattern projector 10 generates an unmodulated pattern or no pattern at all; the object has a clear unmodulated stripe of light formed on it or is imaged by ambient light alone. A scanning means 17 such as a rotating mirror orthogonally sweeps the coded light rays 12 and unmodulated pattern over a rectangular plane.

Linear scan signals sequentially read out of the linear array camera 16 are sent to a range image processor or computer 18 which has a luminance memory. The processor receives video data for succcessive strips of the scene that are read out of linear array camera 16, controls pattern projector 10, coordinates timing of the camera and pattern projector, and has a control (not shown) to step the rotating mirror 17. The output of the camera system is a range image 19 and a luminance image 20, both registered in image space and having M×N points. The range image is a two-dimensional array of scalars, each of which is proportional to the distance from a given reference plane or reference point to each of the possible M×N points in the scene. The luminance image resembles a conventional, two-dimensional, gray scale, luminance based, TV-like image. Thus at each point in the image or scene one knows not only the distance to a given point but also the brightness of that point. The important point is that the images are registered in image space.

Figure 2:
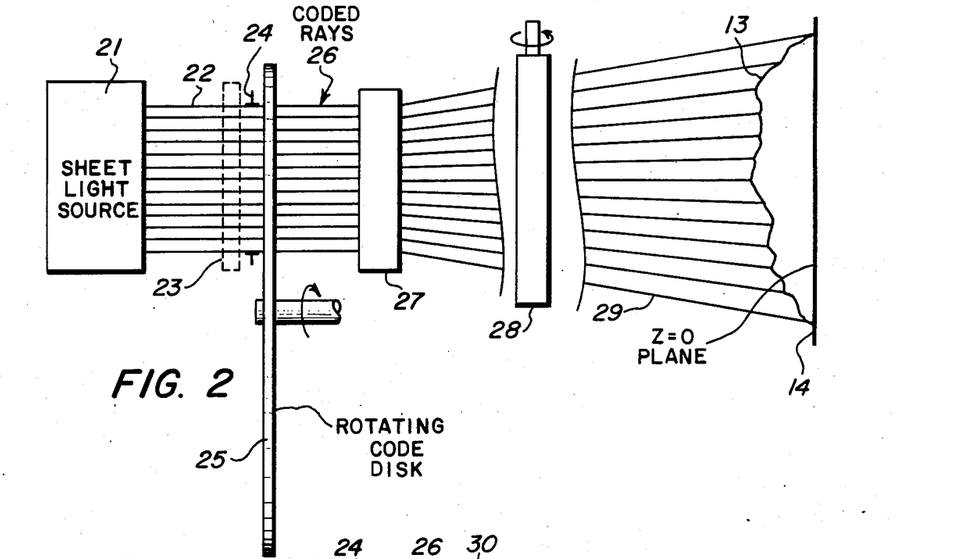
FIG. 2 is a top view of the light ray modulation pattern projector and scanning mirror.
Figure 3:
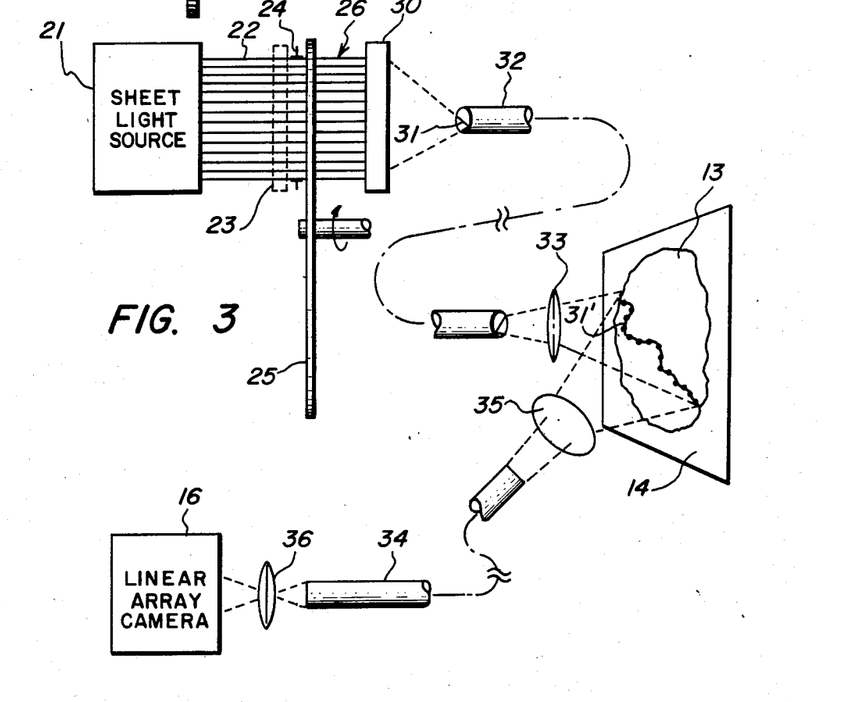
FIG. 3 shows an alternative to the projection scheme in FIG. 2 and has a coherent fiber optic bundle for remote projection of the coded rays.
Figure 4:
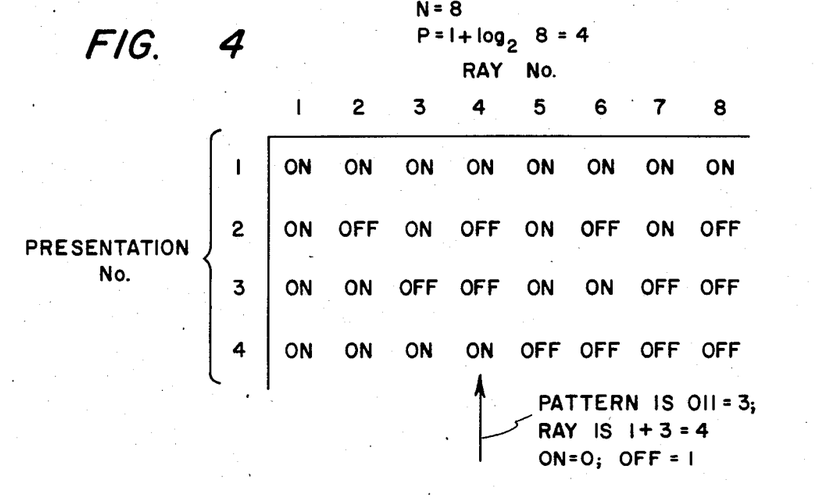
FIG. 4 has a table of ray states at four sequential presentations to explain the principle of time/space coding/of light rays.

FIGS. 2–4 are concerned primarily with the range camera aspect of the system. Pattern projector 10 generates a one-dimensional (1×N) array of light rays each of whose intensities (and/or hues) can be varied with time. In FIG. 2, a light source 21, such as an incandescent point or line source or a laser, emits a collimated sheet of light 22 which is focused, if necessary, by a cylindrical lens 23 into a thin line, say on the order of 0.010–0.020 inches thick. A field stop 24 in the form of a rectangular aperture mask, say 1"×0.008", is placed at the focus of lens 23. This will create a rectangular light source of high intensity. Light sheet 22 impinges on the face of a rotating code disk or wheel 25 similar to an optical encoder disk, in this case a glass disk upon whose surface has been photodeposited a pattern of sectors. Each of the sectors has a pattern comprised of clear and opaque regions to spatially modulate the light sheet 22 into time/space coded light rays 26. The 1×N sheet of coded rays 26 are projected by a projection lens system 27 onto an angularly positional mirror 28, and hence strike the surface of the object 13 to be scanned. An area of N by M points can be scanned by stepping the mirror 28 through M small angular steps. FIG. 2 is a top view of the range/luminance camera; light sheet 22 is horizontal, rotating code disk 25 is vertical, and the axis of rotating mirror 28 is horizontal. In an industrial setup the projected rays 29 are bent through 90° or so onto the object which is placed on a horizontal support 14. The object is stationary as it is scanned. One alternative is that the entire camera system is stationary and object 13 is mounted on a vertically moving robot arm.

Remotely generated modulated, coded light ray patterns and unmodulated light patterns are delivered to the sensing site by a coherent fiber optic bundle as shown in FIG. 3. A reduction lens 30 projects the demagnified image 31 onto the entrance of a coherent optical fiber bundle 32. At the exit end the pattern is reproduced exactly, and is projected with a lens system 33 onto the surface of object 13 where it is imaged by the linear array camera. The illustrated light pattern 31' is a line of N dots of light. A coherent optical fiber bundle 34 can also be used to convey the image of the surface to be area mapped to the linear array camera. This embodiment allows the exit end of coherent fiber bundle 32 and projection lens 33 to be on the robot arm with the image pickup coherent bundle 34 and imaging lens 35. The remainder of the range/luminance camera system including linear array camera 16 and lens 36 at the exit of bundle 34 are remotely located.

The principle of time/space coding of light rays is explained with reference to FIG. 4. The range camera uses the idea of presenting N rays simultaneously in each of P presentations. If there are more than two brightness levels, it can be shown that for N rays, it is possible to uniquely identify all rays by processing $P = 1 + \log_b N$ sequential presentations of rays. In a binary system, $b = 2$, and the number of presentations $P = 1 + \log_2 N$. In each presentation for the binary case, different subsets of the N rays are "on" with the balance of the rays "off". The figure illustrates the principle for $N = 8$; then, $P = 1 + \log_2 8 = 4$. There are four sequential presentations of the coded light rays, all at the same location of the objects to be imaged. In the first presentation, all eight rays are "on"; in the second, the rays are "on" and "off"; in the third, pairs of rays are alternately "on" and "off"; and in the fourth, the first four rays are "on" and the second four rays are "off". If these four presentations are projected onto the object surface, the incident light rays appear as dots of light. Having received the four images, the light rays are uniquely identified as follows. If "on" = 0 and "off" = 1, then at the arrow the pattern in binary notation (reading from bottom to top, presentations 4, 3, and 2) is 011 = 3. The ray is then $1 + 3 =$ No. 4. This uses a straight binary coding of rays; other coding such as a Gray coding may be more useful.

Figure 5:
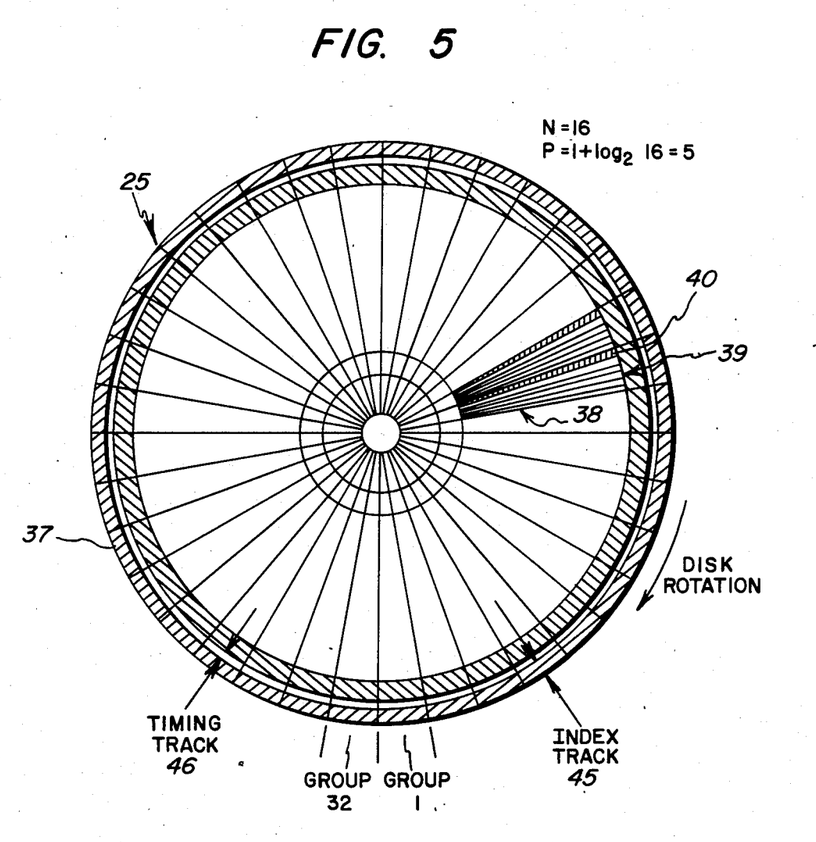
FIG. 5 illustrates the rotating code disk which modulates the light rays; two of the sectors show schematically the five patterns for range and a sixth pattern for luminance.
Figure 6:
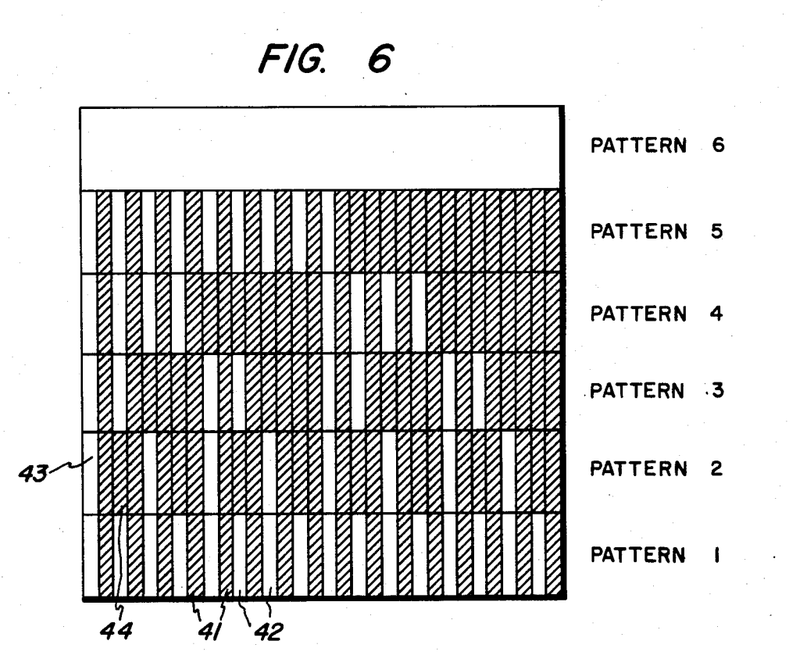
FIG. 6 depicts a typical group pattern in one sector of the code disk where the number of light rays N=16.

The rotating code wheel 25 and its construction are illustrated in FIGS. 5 and 6. When the pattern on the disk is altered slightly, compared to the pattern for a range camera, then a registered range/luminance camera results. After each group of patterned P sectors, there is a completely clear or completely opaque sector. Instead of P presentations, there are P + 1 presentations in order to get both the range image and a luminance image. In these figures the number of light rays $N = 16$ and the number of modulated light pattern presentations $P = 1 + \log_2 16 = 5$. The rotating code disk 25 is comprised of a glass disk 37 onto whose surface has been photo-deposited a pattern of sectors. The illustrated disk has 32 groups of 6 sub-patterns, and the sector-shaped group pattern is indicated at 38, the five patterned sectors at 39, and the additional opaque sector at 40 to facilitate acquisition of luminance data. One group pattern 38 is shown enlarged in FIG. 6. The sector has 32 circular tracks, half of which are opaque guard tracks 41 that alternate with the information tracks 42. Patterns 1–5 have, in the information tracks, clear and opaque regions 43 and 44 to modulate the continuous light sheet into coded light rays. Pattern 1 has 16 of the clear regions 43 and results in the full compliment of 16 light rays. Pattern 2 has alternating clear and opaque regions to result in one ray "on" followed by one ray "off", and patterns 3–5 respectively have two, four, and eight rays "on" followed by the same number "off". Pattern 6, instead of being completely opaque as in FIG. 5, is completely clear and illuminates the object with a continuous bright stripe of light.

Two additional tracks 45 and 46 around the periphery of disk 37 identify the current pattern illuminated as well as provide synchronizing information to the scan electronics. Rotating code disks 4 inches in diameter have been built and operated successfully, and it is contemplated it can be made smaller, down to a 1 inch diameter. By using partially transmitting codings on a given information track, more than two levels of intensity coding can be provided and the light transmission coefficients may be selected to take any value between 0 and 1. The disk can be manufactured by the same technology as is used to make rotating optical encoder disks. Dielectric films and coatings can be deposited on desired sections of the disk allowing for hue as well as intensity modulation.

Figure 7:
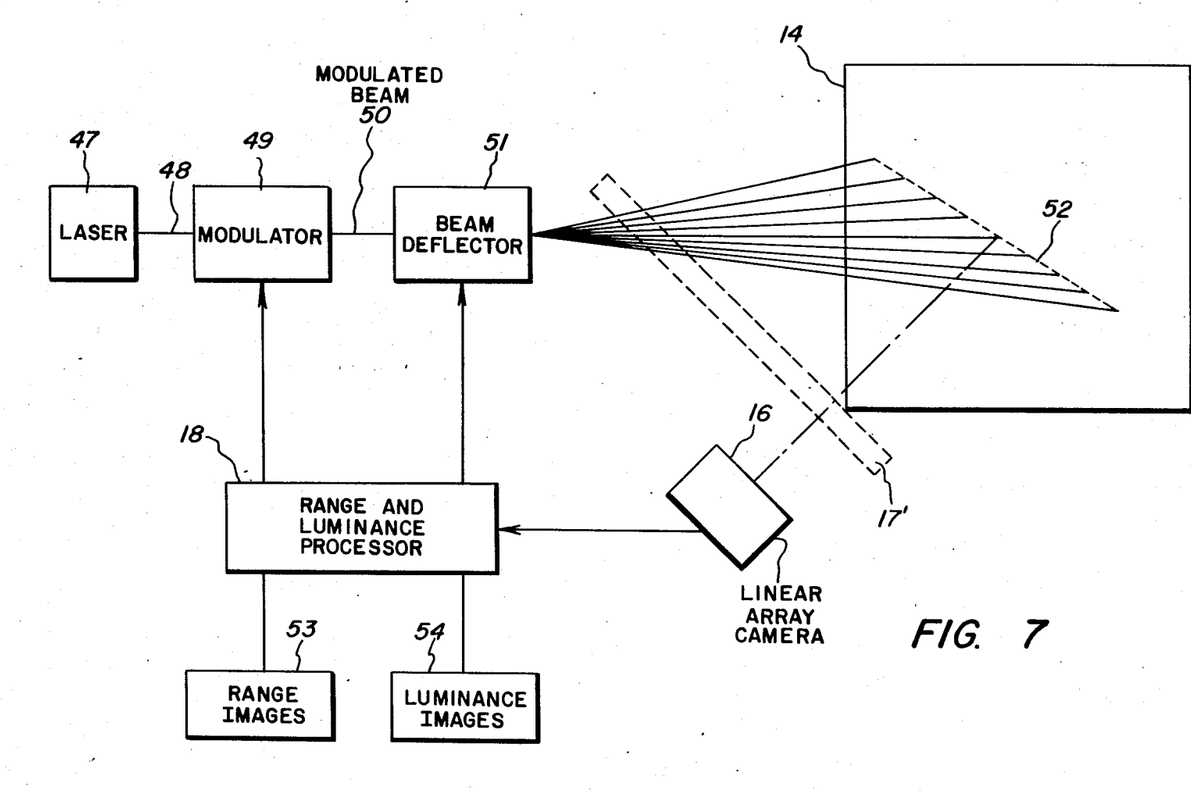
FIG. 7 illustrates a second embodiment of the range/luminance camera and another coded light ray pattern generator and projector.

Referring to FIG. 7, a second technique of modulating the light rays during the course of P sequential presentations uses a scanned laser beam which is modulated as a function of angle by an optical modulator whose modulation information is read out of a read-only memory or similar electronic device. A laser source 47 emits a narrow collimated beam 48 whose intensity is varied by an acousto-optic or electro-optic modulator 49. The modulated beam 50 then is scanned, for instance by a rotating polygonal mirror, galvanometer driven mirrors, or acousto-optic beam deflector 51. The beam deflection is one-dimensional. A modulated beam is illustrated scanned along a straight line 52 on the support surface 14. The laser beam is modulated into an on-off pattern or may have several brightness levels as previously discussed; the modulation pattern is supplied by processor 18 which also controls the beam deflector. In order to generate an M×N image, an incrementally rotatable mirror system 17' can be placed after beam deflector 51. The mirror system makes M small angular steps forming the M×N image. The field of view of the linear array camera 16 also is deflected by the above mirror system. Alternately, the object can be moved stepwise past the active profiling "strip" 52. This laser pattern projector can be used to give registered range and luminance images 53 and 54. All that is needed is to allow the beam to be completely blanked or unblanked and have an unmodulated sweep during the traverse period which immediately follows the group of P modulated sweeps. Thus the total number of sweeps needed to derive a range/luminance profile is P+1, rather than P. If beam blanking is used, then an ambient illuminated scene results; the object could be, for instance, illuminated at 45°. This will result in a naturally lit image. If the unblanked beam sweep is used, then a frontal, artifically illuminated scene results.

Figure 8:
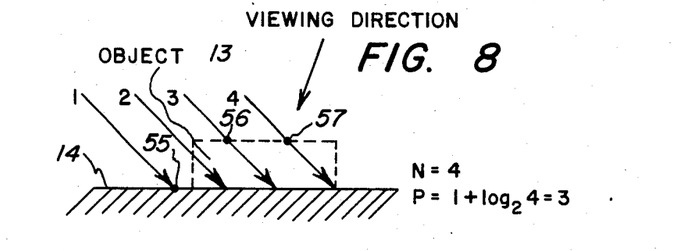
FIG. 8 is a sketch of light rays (N=4) incident on a reference surface and on an object.
Figure 9:
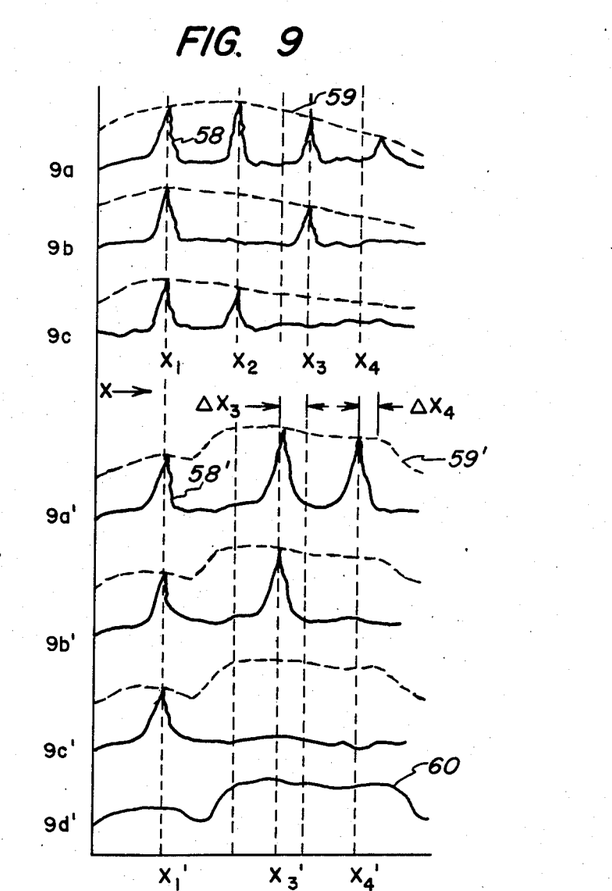
FIG. 9 shows output voltage waveforms of the line scan camera and, in dashed lines, the modulated "envelope" due to surface reflectivity variations; lines 9a–9c for three presentations of coded light rays on the reference surface, lines 9a'–9c' for presentations of coded light rays on the object surface, and line 9d' for a clear unmodulated light stripe on the object surface to get the luminance image.

The video signals outputted by linear array camera 16 and the range image and luminance image processor or computer 18 are now discussed in greater detail, and incident to this the unique identification of light rays and the range calculations are reviewed. FIG. 8 shows a simple object 13 on the support or reference surface 14, four light rays incident on the reference surface, and the visible points of light 55, 56 and 57 where rays 1, 3 and 4 strike the support and object surface. Here $N=4$ and the number of P sequential presentations of time/space coded light rays is 3. Two sets of one-dimensional scan signals from linear array camera 16 are illustrated, lines 9a–9c with the rays incident on the reference plane (for calibration purposes), and lines 9a'–9d' with the object in place. Line 9d' shows the scan signal corresponding to luminance or brightness of the scene; no such signal is needed for the calibration set.

Line 9a is the one-dimensional waveform with rays 1–4 "on", line 9b with rays 1 and 3 "on", and line 9c with rays 1 and 2 "on". These waveforms have one or more peaks 58 at X axis locations corresponding to image points of light. The envelopes 59 in all three presentations are identical and represent variations in reflectance, etc. across the support surface. The signal peaks in all three presentations remain in the same place. Let "on"=0, "off"=1. At $X=X_1$, reading from bottom to top, the ray no.=1+00 =1; at $X=X_2$, the ray no.=1+01=2; at $X=X_3$, the ray no.=1+10=3, at $X=X_4$, the ray no.=1+11=4. Thus, all the reference plane light rays are determined unambiguously. When measuring range and luminance with the object in place, as seen from the viewing direction, ray 1 strikes reference surface 14 at point 55, ray 2 is not visible, and rays 3 and 4 strike the object at points 56 and 57. The last two rays are shifted to the left by an amount proportional to the object height relative to the reference points where those rays are incident on reference surface 14.

With the object in place, the waveforms shown on lines 9a'-9c' are to be analyzed. The signal peaks 58' are at the same X axis locations in all three waveforms, and the envelopes 59' are not the same as envelopes 59 because the reflectivity variations, etc., of the object are not identical to those of the support. The ray numbers are determined as follows. At $X=X_1'$, the ray no.=1+00=1; at $X=X_3'$, the ray no.=1+10=3; at $X=X_4'$, the ray no.=1+11=4. There is no ray no. 2. Determining height at the ith point involves determining the displacement (measured along the X axis) of the ith peak from a calibration, zero height, reference plane peak. The shift of ray $1=X_1-X_1'=0$; ray 2 is unknown; ray $3=X_3-X_3'=\Delta X_3$; ray $4=X_4-X_4'=\Delta X_4$. The actual more detailed system operation to calculate range from the P one-dimensional scan signals is outlined in Ser. No. 717,367. Range at N points along a line is computed in this way.

During the interval when the modulated pattern sectors are projected, the one-dimensional waveforms are collected and processed for eventual range profile calculation. During the interval when the opaque or clear sector is in place the object being imaged is illuminated by ambient light or has a clear unmodulated white stripe of light following on it. The additional scan signal 60 shown in line 9d' is exactly the luminance or brightness image for that strip or narrow long rectangular area of the object, and is exactly in registration with the range image sampled at N points across the same strip of the object. The approximate extent of object 13 and the location of the edges is discernible in this signal. To get area images, each of the M sets of scan signals are analyzed and yield the range and luminance along parallel successive strips of the object and support surfaces. The shape of object 13 (here a rectangular box) can be discerned from the area luminance image.

The registered pair of range and luminance images make it faster, easier and cheaper to achieve object recognition and object pose estimation for the reasons already explained. Often, questions which are difficult to answer from luminance data are easy to answer from range data and vice versa. Through the use of registered range/reflectance processing, it appears that complex questions of image understanding may be able to be answered by jointly processing the range image in parallel with the luminance image.

While the invention has been particularly shown and described with reference to preferred embodiments thereof, it will be understood by those skilled in the art that the foregoing and other changes in form and details may be made without departing from the spirit and scope of the invention.

What is claimed is:

1. An integrated range and luminance camera comprising:
   a planar pattern projector to generate a 1×N array of time and space coded light rays and to project P sequential presentations of modulated light patterns and an unmodulated pattern onto the surface of a three-dimensional object at the same place, where $P=1+\log_b N$, b is the number of brightness levels and N is the number of rays;
   a linear array sensor which detects, at an angle to projected rays, light incident on the object and generates P one-dimensional scan signals having peaks at locations corresponding to the intersections of said light rays with the object surface, and an additional scan signal corresponding to brightness; and
   a processor to analyze said P scan signals to uniquely identify all rays and determine range to the object surface at N points along a line, and to analyze said additional scan signal to determine luminance along that line, and to provide registered range and luminance images.

2. The integrated camera of claim 1 and means for scanning said coded light rays and unmodulated pattern by steps over a rectangular plane, whereby successive strips of said object are imaged by said linear array sensor and registered area range and luminance images are produced.

3. The integrated camera of claim 2 wherein said pattern generator includes a sheet light source and a rotating code disk which has at least one group pattern comprised of one pattern per presentation having discrete regions whose light transmission coefficients are selected to spatially modulate the light sheet into said coded light rays, said group pattern including an additional uniform pattern with a selected light transmission coefficient.

4. The integrated camera of claim 3 wherein said pattern generator also includes a reduction lens to project said modulated and unmodulated light patterns onto the entrance of a coherent fiber optic bundle, and a projection lens to reimage said light patterns on the object surface.

5. The integrated camera of claim 2 wherein said pattern projector includes a sheet light source and a rotating code disk which has at least one group comprised of one pattern per presentation having clear and opaque regions to spatially modulate the light sheet into said coded light rays, said group pattern having an additional uniformly clear or opaque pattern.

6. The integrated camera of claim 1 wherein said pattern generator includes a narrow laser beam source, a modulator to programmably vary the intensity of said laser beam, a beam deflector to sweep the modulated beam along a straight line, and an incrementally rotatable mirror system to scan said modulated beam over a plane and project it onto the surface of a three-dimensional object.

7. An integrated range and luminance camera comprising:
   a planar pattern projector to generate a 1×N array of time and space coded light rays and to project P sequential presentations of modulated light patterns and an additional unmodulated pattern onto the surface of an object, where $P=1+\log_2 N$ and N is the number of light rays;
   means for scanning said coded light rays and unmodulated pattern by steps over a rectangular plane;

a linear array camera which detects, at an angle to projected rays, points of light and light incident on the object and generates P one-dimensional scan signals having peaks at locations corresponding to imaged points of light where said coded rays are incident on the surface of said object, and an additional scan signal corresponding to brightness, said linear array camera generating a set of said scan signals at every step; and a processor to analyze said scan signals, set by set, to uniquely identify all rays and to determine range at points along a line on said object, and to determine luminance along that strip, and to output registered area range and luminance images.

8. The integrated camera of claim 7 wherein said pattern generator includes a collimated light sheet source, a rotating code disk which has sector-shaped group patterns each comprised of one pattern per presentation of clear and opaque regions to spatially modulate the light sheet into said coded light rays, and an additional clear or opaque pattern, said patterns being illuminated one at a time in sequence.

9. The integrated camera of claim 8 further including a reduction lens which projects said coded light rays and unmodulated pattern onto the entrance of a coherent fiber optic bundle, and a projection lens to reimage the same on the object surface.

10. An integrated range and luminance camera comprising:
 a narrow laser beam source;
 a modulator to programmably vary the intensity of said laser beam;
 a beam deflector to sweep the modulated beam along a straight line; said modulator and beam deflector generating a $1 \times N$ array of time and space coded light rays and sequential presentations of different subsets of said light rays during P modulated sweeps followed by an unmodulated sweep during which said laser beam is completely blanked or unblanked, where $P = 1 + \log_b N$, b is the number of brightness levels and N is the number of light rays;
 means for scanning said modulated beam by steps over a rectangular plane and project it onto the surface of a three-dimensional object;
 a linear array camera to detect points of light where said light rays intersect the surface of said object, and other incident light, and generate at every step P one-dimensional scan signals and an additional scan signal corresponding to brightness; and
 a processor to analyze said scan signals to uniquely identify all rays, determine range at N points along a line and luminance along that strip, and produce registered area range and luminance images.

11. The integrated camera of claim 10 wherein said modulator and beam deflector are controlled by said processor.

* * * * *